United States Patent Office 2,789,896
Patented Apr. 23, 1957

2,789,896
PROCESS FOR REDUCING METAL OXIDES

Lynn Wallace Coffer, Columbus, Ohio, assignor to Climax Molybdenum Company, a corporation of Delaware No Drawing. Application March 15, 1956, Serial No. 571,594

1 Claim. (Cl. 75—27)

The present invention relates to the well known Goldschmidt process of reducing metal oxides which involves igniting a mixture of the metal oxide and a reducing agent consisting of another metal having a greater affinity for oxygen than the metal of the oxide.

In theory, any metal having a greater affinity for oxygen than another will, at some temperature, reduce the oxide of the other metal. However, the ignition process to which the present invention relates is an exothermic reaction; and, to be of practical effect, the heat generated by the reaction must be sufficient to melt the reduced metal and the resulting oxide of the reducing metal so that they may separate by gravity while in a molten state. As a result, the use of the process in cases where it was desired to reduce metal oxides has been limited to combinations of metal oxides and reducing metals which, upon reaction, release sufficient heat to produce a molten mass of the reaction products.

The amount of heat released by the reaction equals the difference between the heat released on oxidation of the reducing metal and the heat of formation of the metal oxide which is reduced. For that reason, it is preferred to use, as the reducing metal, a metal such as aluminum which is not only available at reasonable cost but has a high heat of formation of its oxide, $Al_2O_3$ (i. e., 399.09 kilo-calories per gram mole of the oxide). However, magnesium, silicon and calcium, or other metals having a greater affinity for oxygen than the metal of the oxide to be reduced may be used, if desired.

The quantity of heat released when aluminum is used to reduce a number of metal oxides is given in the following list of aluminum reduction reactions in kilocalories per gram mole of the oxide which is reduced:

(1) $3V_2O_5 + 10Al \rightarrow 6V + 5Al_2O_3$—295 k-cal.
(2) $CrO_3 + 2Al \rightarrow Cr + Al_2O_3$—260 k-cal.
(3) $3Fe_3O_4 + 8Al \rightarrow 9Fe + 4Al_2O_3$—265 k-cal.
(4) $MoO_3 + 2Al \rightarrow Mo + Al_2O_3$—219 k-cal.
(5) $Fe_2O_3 + 2Al \rightarrow 2Fe + Al_2O_3$—203 k-cal.
(6) $3Nb_2O_5 + 10Al \rightarrow 6Nb + 5Al_2O_3$—202 k-cal.
(7) $Mn_2O_3 + 2Al \rightarrow 2Mn + Al_2O_3$—167 k-cal.
(8) $3Ta_2O_5 + 10Al \rightarrow 6Ta + 5Al_2O_3$—165 k-cal.
(9) $3MnO_2 + 4Al \rightarrow 3Mn + 2Al_2O_3$—141 k-cal.
(10) $Cr_2O_3 + 2Al \rightarrow 2Cr + Al_2O_3$—129 k-cal.
(11) $3TiO_2 + 4Al \rightarrow 3Ti + 2Al_2O_3$—48 k-cal.
(12) $3ZrO_2 + 4Al \rightarrow 3Zr + 2Al_2O_3$—10 k-cal.

The values for the heat released which are given in the table are based on the heats of formation of the oxides at 25° C. and not the true heats of formation at the higher temperature at which the reaction actually occurs. Thus, the table indicates only relatively the amount of heat released by these reactions.

Whether or not the above reactions will result in satisfactory reduction of the metal oxide without added heat depends not only upon the quantity of heat released but the quantity and specific heat of the reaction products and also the melting point of the reaction products.

In the case of Reactions (1), (2), (3), (4), (5), and (9), the quantity of heat is sufficient to effect a fairly satisfactory reduction. Due to the higher melting points of the reduced metals or the smaller quantity of heat released, or a combination of both, the remaining reactions are not effective alone. However, $Cr_2O_3$, Reaction (10), may be reduced if combined with a quantity of $CrO_3$, Reaction (3). Similarly, Reaction (4) is used commercially in conjunction with Reactions (3) or (5) to produce an iron-molybdenum alloy, in which case the iron reduction not only increases the total heat released, but reduces melting point of the reduced alloy below that of molybdenum. This last type of combined reaction is useful only in the production of alloys.

It has also been proposed that other oxides be added to these reactions and reduced along with the metal oxide in question to increase the heat generated; but, except for barium oxide, which is expensive and not always effective, these either introduce undesirable impurities or cause an objectionable evolution of gas. Consequently, the Goldschmidt process has been of only limited application.

To overcome this limiting factor, it has also been proposed that external heat be applied to assist the process; but, to be effective on high melting point materials, the reaction must occur so rapidly that it has been found impossible to transmit the requisite heat to the mass from an external source during the reaction.

It is the object of the present invention to provide an improved method in accordance with which the heat released incident to the reducing reaction may be increased to any desired degree without otherwise impairing the effectiveness of the reaction. As a result, the increased heat released by ignition will make the process more effective when applied to oxides which have been reduced successfully by the Goldschmidt process and will also make the process applicable to oxides which have not been reduced successfully by the process.

In accordance with the present invention the heat released incident to the reduction of any metal oxide or mixture of metal oxides by any reducing metal is increased to any desired degree by combining liquid oxygen with the powdered reaction mixture and increasing the quantity of reducing metal so that it will react with all oxygen in the mixture. Since the oxidation of the reducing metal with pure oxygen releases a much greater quantity of heat than that released when the same reducing metal is oxidized by a metal oxide, the heat imparted to the total charge by the reducing reaction is increased markedly by the simultaneous reaction between the liquid oxygen and excess reducing metal even when relatively small amounts of the latter are added. Moreover, the amount of additional heat imparted to the charge may be increased to meet the requirements of any reducing reaction by simply increasing the amount of liquid oxygen and supplemental reducing metal which is added to the charge.

In accordance with standard practice the metal oxide and the reducing metal are powdered or reduced to small grains and are intimately mixed so that the reaction will occur very rapidly and uniformly throughout the charge once it is ignited. However, in accordance with the present invention, more reducing metal is added than is necessary to react with the oxide and produce the desired product or alloy, and sufficient liquid oxygen is added to the mixture to react with the excess reducing metal. The liquid oxygen is also mixed thoroughly and uniformly through the charge to ensure that it will react with the reducing metal as rapidly as possible and thus raise the temperature of the charge to the maximum degree. Due to the fact that the oxygen is in a liquid state, it is possible to incorporate the stoichiometric quantities in the mixture in intimate contact with the small particles of the reducing metal. Since the reducing metal, by definition, has a greater affinity for oxygen than the metal of the oxide, the free oxygen will react with the reducing metal in preference to the metal of the oxide if any reduction of the latter occurs prior to completion of the reaction between the free oxygen and the reducing metal.

The improved process is not limited in its application to the reduction of a single metal oxide but may be employed to produce alloys. This can be done either by simultaneously reducing a mixture of the oxides of two or more metals or by adding an excess of the reducing metal so that the excess will alloy with the reduced metal. While aluminum is preferred as the reducing metal because of its high heat of reaction on oxidation and its availability, the desired to produce an alloy incorporating another reducing metal may dictate its use in place of aluminum.

To be successful, substantially all of the reaction products resulting from ignition of the charge must be melted and remain in a liquid state long enough to permit separation of the reduced metal from the slag (i. e., the oxide of the reducing metal). Since this separation is a stratification resulting from the action of gravity, it is necessary for the molten materials to have sufficient fluidity. In the past it has been common practice to add to the charge certain stable oxides or fluorides as "slag conditioners" which decrease the melting point or increase the fluidity of the slag. These slag conditioners, such as burned lime and fluorspar, usually remain unaffected by the reaction, and may be used, if desired, in the improved process of the present invention. Similarly, a mixture of reducing metals such as aluminum and magnesium may be used to introduce some MgO into the slag.

Vaporization and consequent loss of oxygen prior to ignition should be prevented or reduced to a negligible factor either by maintaining sufficient pressure on the mixture or by cooling the mixture prior to or during the process of adding the liquid oxygen until the temperature of the charge as a whole is in the neighborhood, or below that, at which liquid oxygen will vaporize at the pressure acting on the charge (−183° C. at atmospheric pressure). If the charge is mixed with liquid oxygen in one container and then transferred to a separate chamber in which the reaction is to take place, the reaction chamber should be precooled to the same temperature and the mixture should be ignited as quickly as possible to prevent loss of oxygen by vaporization if the process is carried out at atmospheric pressure.

The charge can be cooled incident to the addition of the liquid oxygen at atmospheric pressure by simply continuing to add and mix liquid oxygen with the charge in an open container until the desired quantity of liquid oxygen remains incorporated in the charge. This can be determined by mixing the charge on a weighing scale. This method, however, is wasteful of liquid oxygen since it requires a great excess to chill the charge to a temperature at which vaporization of the added liquid oxygen ceases. For that reason it is preferred to chill the dry powders by other means before adding the liquid oxygen. Liquid oxygen is obtained from air, and nitrogen is a by-product; therefore, it is more economical to use liquid nitrogen to precool the charge and the reaction container, care being taken to avoid inclusion of nitrogen in the charge at the time of ignition. The mixing container with the dry charge may be partially or wholly immersed in liquid nitrogen to precool both the container and the charge and thereafter the liquid oxygen may be added and mixed while the container is immersed in the liquid nitrogen. A quantity of liquid nitrogen may be poured into the reaction chamber to chill it, but should be fully vaporized or removed prior to adding the charge.

Any known type of reaction container may be employed. These may include any of the various means which have been proposed to retain the reaction products in the container during the relatively violent reaction which results upon ignition. However, the reaction may take place in a simple pot or crucible, the usual care being taken to avoid injury to personnel and equipment in view of the possibility of explosive reactions. The pot may be made of any suitable refractory material, although it is advantageous to employ a material which has low thermal conductivity. Magnesium oxide is a satisfactory refractory for that reason.

For very high melting point materials, such as molybdenum, which are likely to dissolve or react with the crucible material, the charge may be placed in an inner container of the same metal as that in the oxide to be reduced. While this container may eventually melt in whole or part, it will prevent, or at least reduce the time of, contact between the molten reduced metal and the crucible walls. Such expedients are known and, of themselves, form no part of the present invention.

Similarly, any known method of igniting the mixture may be employed. For example, a small aluminum solazone (Al+Na2O2) bomb having a paper fuse may be employed, or the ignition may be effected electrically by a resistance wire or spark. Once the charge is ignited, it proceeds to completion without requiring added heat.

The quantity of liquid oxygen employed may be varied widely to achieve the desired results. For example, due to the small quantity of heat released incident to the reduction of titanium oxide or zirconium oxide by aluminum, larger quantities of liquid oxygen and added aluminum are required than for other reducing reactions.

Satisfactory reduction of titanium by aluminum has been achieved with additions of liquid oxygen equivalent to from 50–100% of the oxygen in the titanium oxide, the total aluminum being that necessary to react with the oxygen in the titanium oxide and also the liquid oxygen, but even greater quantities of liquid oxygen may be used in this reaction. Similarly, other things being equal, the quantity of liquid oxygen should be increased to compensate for reaction products having higher melting points or for reactions which, due to the use of stable slag conditions or otherwise, have larger quantities of material in the reaction chamber after the reaction, or for reactions using other reducing metals than aluminum and which have lower heats of reaction. There appears to be nothing critical about the amount of liquid oxygen added, so long as sufficient is present to increase the heat developed to the desired degree. In the case of reactions which already develop sufficient heat to melt the reaction products, any amount of added liquid oxygen and reducing metal will be beneficial in that the increased total heat developed will make the reaction products more fluid and hold them in a molten state for a longer period so that improved separation of metal and slag will result.

Typical examples of the improved process which were carried out at atmospheric pressure include the following:

Example 1

Forty pounds of powdered titanium oxide was mixed with 27.87 pounds of aluminum (Alcoa grain), 6.8 pounds of burned lime (CaO) and 6.8 pounds of fluorspar ($CaF_2$). The mixture was cooled by stirring in an open container, the lower end of which was immersed in a bath of liquid nitrogen. The container was then placed on a weighing scale and liquid oxygen added and stirred thoroughly into the mixture until a weight gain of 8 pounds (equivalent to 50% of oxygen in the titanium oxide) was registered. The mixture was then dumped into a previously chilled crucible made of "Permanente #165" ramming mix (96% MgO) and immediately ignited by an aluminum-solazone bomb. The reaction required about fifteen seconds to reach completion, and produced a lump of metal weighing 14.18 pounds, some of the material having been thrown from the crucible by the violence of the reaction. The metal product contained 69% titanium, about 27% aluminum and the balance impurities. The relatively high aluminum content is believed to be due primarily to the affinity of titanium for aluminum. This factor evidently causes some of the aluminum to alloy with the reduced titanium before it can react with the titanium oxide.

Example 2

Twenty pounds of powdered titanium oxide was mixed with 13.3 pounds of aluminum (Alcoa grain), 4.3 pounds of magnesium grain, 22.81 pounds of burned lime (CaO), and 6.04 pounds of fluorspar. This mixture was cooled partly by liquid nitrogen and partly by liquid oxygen as in the case of Example 1; liquid oxygen was added until a weight gain of 6.01 pounds was registered (equivalent to 75% of oxygen in the $TiO_2$). An additional quantity of about 300 cc. of liquid oxygen was poured on top of the mixture in the reaction chamber immediately before firing to facilitate ignition. The mixture was ignited as in the case of Example 1 and produced metal analyzing 71.4% titanium, 29.6% aluminum and 5.92% impurities. In this case it will be noted that the reduction was effected in part by aluminum and in part by magnesium. The excess oxygen added at the last moment facilitates ignition and may compensate for some oxygen loss.

Example 3

Twenty-five pounds of powdered titanium oxide was mixed with 4.0 pounds of powdered molybdenum oxide ($MoO_3$), 22.88 pounds of aluminum (Alcoa grain) 20.74 pounds of burned lime (CaO), and 7.46 pounds of fluorspar ($CaF_2$). The dry ingredients were mixed and cooled as in Example 1, and sufficient liquid oxygen added to effect a weight gain of 7.51 pounds (equivalent to 75% of the oxygen in the $TiO_2$). After the mixture was dumped into the reaction chamber, about 500 cc. of liquid oxygen was poured on top and the mixture was immediately ignited. The resulting metal analyzed 7.12% molybdenum, 52.80% titanium, 31.80% aluminum and 2.68% impurities. This represented a recovery of 93.3% of the molybdenum and 76.78% of the titanium. In this reaction a slight excess of aluminum was used.

Similar procedures may be used to reduce zirconium oxide, but in that case the use of a quantity of liquid oxygen equal to from 75–100% of the oxygen in the $ZrO_2$ is preferred. The remaining oxides listed above are easier to reduce that titanium and zirconium and will ordinarily require less oxygen.

It will be apparent from the above that the present invention resides in the broad concept of increasing the heat released incident to the reduction of metal oxides by a reducing metal, i. e., a metal having a greater affinity for oxygen than the metal or metals of the oxide, by adding to the mixture liquid oxygen and an excess quantity of the reducing metal. The improvement is applicable to any known "Thermit" type reaction procedure and makes possible the reduction of metal oxides hitherto not capable of being reduced by this type of reaction, as well as improved reactions in cases where the process has been used.

What is claimed is:

The process of reducing powdered metal oxides which includes mixing the metal oxide with a powdered metal which will reduce the oxide, combining with the mixture a quantity of liquid oxygen, and igniting the mixture before the liquid oxygen has vaporized, the quantity of reducing metal being at least sufficient to react with substantially all of the liquid oxygen and substantially all of the oxygen in the metal oxide to be reduced.

No references cited.